US009802534B1

(12) United States Patent
Salter et al.

(10) Patent No.: US 9,802,534 B1
(45) Date of Patent: Oct. 31, 2017

(54) ILLUMINATED VEHICLE COMPARTMENT

(71) Applicant: Ford Global Technologies, LLC, Dearborn, MI (US)

(72) Inventors: Stuart C. Salter, White Lake, MI (US); Paul Kenneth Dellock, Northville, MI (US); Scott Low, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/299,799

(22) Filed: Oct. 21, 2016

(51) Int. Cl.
*B60Q 1/00* (2006.01)
*B60Q 3/00* (2017.01)
*B60Q 3/06* (2006.01)
*B60R 13/01* (2006.01)
*B60Q 1/30* (2006.01)
*F21S 8/10* (2006.01)
*F21V 9/16* (2006.01)
*H05B 37/02* (2006.01)

(52) U.S. Cl.
CPC ............... *B60Q 3/06* (2013.01); *B60Q 1/307* (2013.01); *B60Q 3/008* (2013.01); *B60R 13/01* (2013.01); *F21S 48/215* (2013.01); *F21V 9/16* (2013.01); *H05B 37/0227* (2013.01); *H05B 37/0272* (2013.01); *B60Q 2500/10* (2013.01)

(58) Field of Classification Search
CPC .. B60Q 1/30; B60Q 1/307; B60Q 3/30; B60R 13/01; B60R 13/011; B60R 13/013; B60R 2013/015; B60R 2013/016; B60R 2013/018; F21S 48/215; F21V 9/16; H05B 37/0227; H05B 37/0272
USPC .................. 362/485, 487, 496, 509–510
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,260,988 B1 | 7/2001 | Misawa et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |

(Continued)

FOREIGN PATENT DOCUMENTS

| | | |
|---|---|---|
| CA | 2771287 A1 | 9/2012 |
| CN | 101337492 A | 1/2009 |

(Continued)

*Primary Examiner* — Jason Moon Han
(74) *Attorney, Agent, or Firm* — Jason Rogers; Price Heneveld LLP

(57) ABSTRACT

A vehicle is provided herein that includes a pickup box defining a storage compartment therein. A liner is disposed on an exterior surface of the pickup box. A first luminescent structure is disposed within the liner and is configured to luminesce in response to receiving excitation light from a first light source.

20 Claims, 7 Drawing Sheets

(56) References Cited

U.S. PATENT DOCUMENTS

| | | |
|---|---|---|
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,354,182 B2 | 4/2008 | Bartels |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,103,414 B2 | 1/2012 | Boss et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,765 B2 | 4/2013 | Kuhlman et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,937,454 B2 | 1/2015 | Baarman et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,194,168 B1 | 11/2015 | Lu et al. |
| 9,299,887 B2 | 3/2016 | Lowenthal et al. |
| 9,442,888 B2 | 9/2016 | Stanfield et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0030136 A1 | 2/2007 | Teshima et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0020101 A1 | 1/2012 | Pastrick et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0009855 A1 | 1/2013 | Gally et al. |
| 2013/0092965 A1 | 4/2013 | Kijima et al. |
| 2013/0154821 A1 | 6/2013 | Miller et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0203587 A1 | 7/2014 | Krishnan et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0138806 A1 | 5/2015 | Salter et al. |
| 2015/0267881 A1 | 9/2015 | Salter et al. |
| 2015/0324708 A1 | 11/2015 | Skipp et al. |
| 2015/0339928 A1 | 11/2015 | Ramanujam |
| 2015/0346727 A1 | 12/2015 | Ramanujam |
| 2015/0366036 A1 | 12/2015 | Luostarinen |
| 2016/0016506 A1 | 1/2016 | Collins et al. |
| 2016/0082880 A1 | 3/2016 | Co et al. |
| 2016/0236613 A1 | 8/2016 | Trier |

FOREIGN PATENT DOCUMENTS

| | | |
|---|---|---|
| CN | 201169230 Y | 2/2009 |
| CN | 201193011 Y | 2/2009 |
| CN | 202357840 U | 8/2012 |
| CN | 204127823 U | 1/2015 |
| CN | 104869728 A | 8/2015 |
| CN | 105303642 A | 2/2016 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2719580 A1 | 4/2014 |
| EP | 2778209 A1 | 9/2014 |
| JP | 2000052859 A | 2/2000 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2008093266 A1 | 8/2008 |
| WO | 2009144629 A1 | 12/2009 |
| WO | 2014068440 A1 | 5/2014 |

ILLUMINATED VEHICLE COMPARTMENT

FIELD OF THE INVENTION

The present disclosure generally relates to vehicle lighting systems, and more particularly, to vehicle lighting systems employing one or more luminescent structures.

BACKGROUND OF THE INVENTION

Illumination arising from the use of luminescent structures offers a unique and attractive viewing experience. It is therefore desired to implement such structures in automotive vehicles for various lighting applications.

SUMMARY OF THE INVENTION

According to one aspect of the present invention, a vehicle is disclosed that includes a pickup box defining a storage compartment therein. A liner is disposed on an exterior surface of the pickup box. A first luminescent structure is disposed within the liner and is configured to luminesce in response to receiving excitation light from a first light source.

According to another aspect of the present invention, a vehicle is disclosed that includes a storage compartment. A first light source is configured to emit light within the storage compartment. First and second luminescent structures are disposed within the storage compartment. The first and second luminescent structures independently luminesce based on a wavelength of an excitation light received from the light source.

According to yet another aspect of the present invention, a vehicle is disclosed that includes a pickup box defining a storage compartment therein. A light source is configured to direct excitation light into the storage compartment. A liner is disposed within the storage compartment. A luminescent structure is disposed on an upwardly extending surface of the storage compartment. The luminescent structure luminesces in response to receiving excitation light from the light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
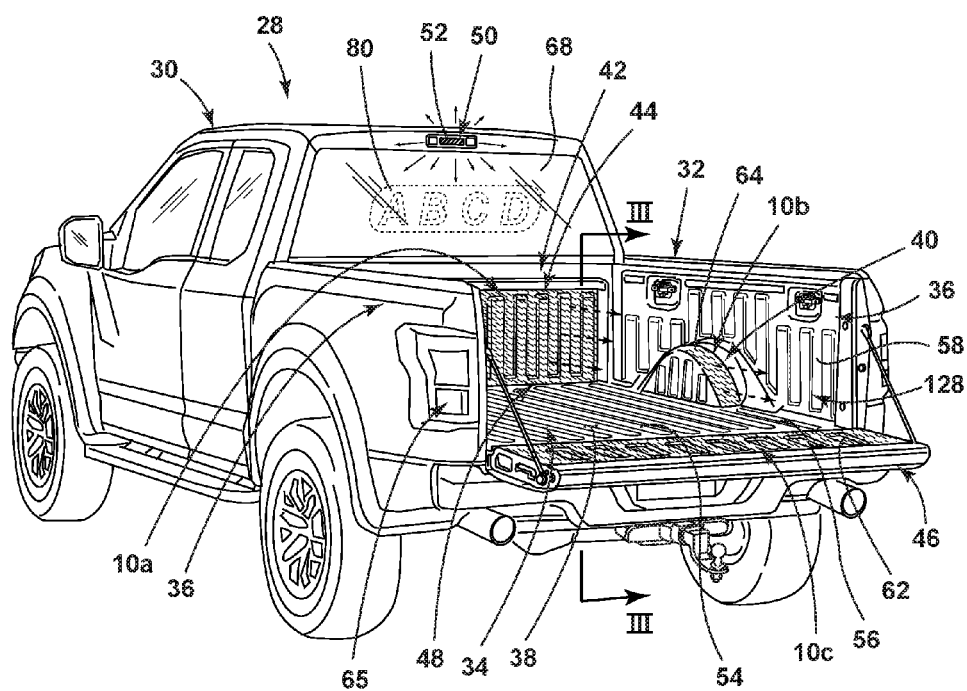
FIG. 2 illustrates a rear perspective view of a vehicle having a truck pickup box arranged in an open position, according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated compartment, which may be configured as a truck box. The compartment may advantageously employ one or more phosphorescent and/or luminescent structures to illuminate in response to predefined events. The one or more luminescent structures may be configured to convert excitation light received from an associated light source and re-emit the light at a different wavelength typically found in the visible spectrum.

Figure 1A:
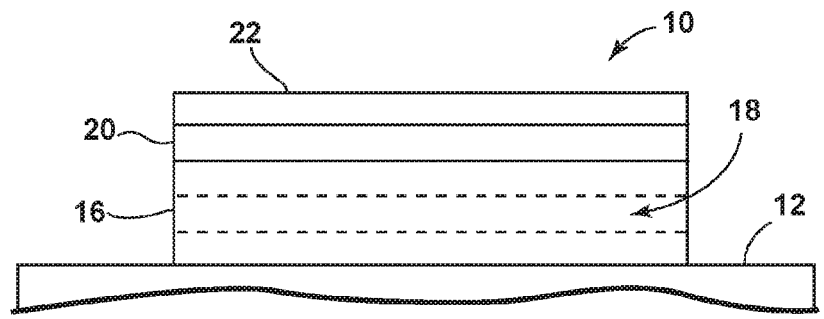
FIG. 1A is a side view of a luminescent structure rendered as a coating for use in a luminescent latch assembly according to one embodiment.
Figure 1B:
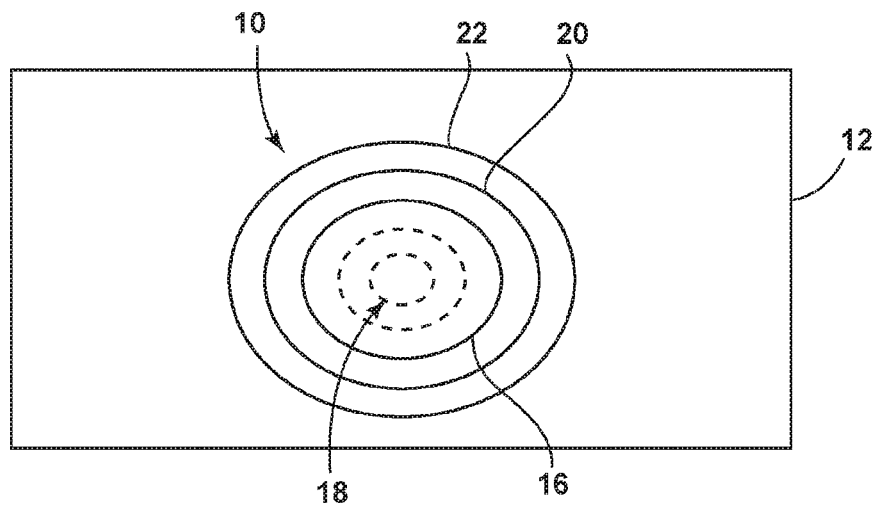
FIG. 1B is a top view of a luminescent structure rendered as a discrete particle according to one embodiment.
Figure 1C:
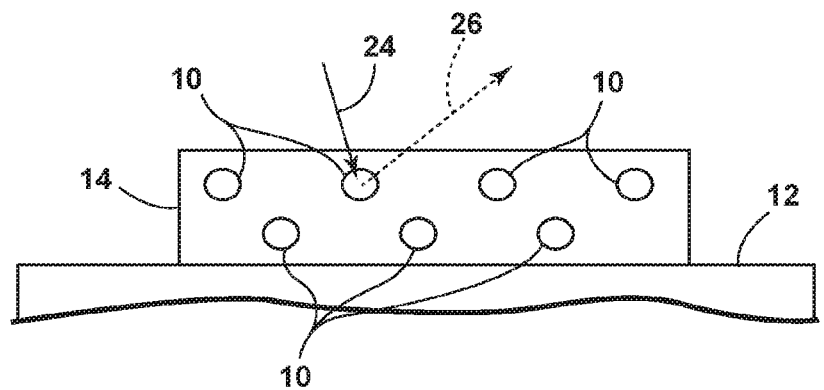
FIG. 1C is a side view of a plurality of luminescent structures rendered as discrete particles and incorporated into a separate structure.

Referring to FIGS. 1A-1C, various exemplary embodiments of luminescent structures 10 are shown, each capable of being coupled to a substrate 12, which may correspond to a vehicle fixture or vehicle related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown through broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source 72 (FIG. 3) is referred to herein as excitation light 24 and is illustrated herein as solid arrows. In contrast, light emitted from the luminescent structure 10 is referred to herein as luminescence by the luminescent structure 10, or converted light 26, and is illustrated herein as broken arrows. The mixture of excitation light 24 and converted light 26 that may be emitted simultaneously is referred to herein as emitted light.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of luminescent structures 10 is disclosed in U.S. Pat. No. 8,232,533 to Kingsley et al., the entire disclosure of which is incorporated herein by reference. For additional information regarding fabrication and utilization of luminescent materials to achieve various light emissions, refer to U.S. Pat. No. 8,207,511 to Bortz et al., U.S. Pat. No. 8,247,761 to Agrawal et al., U.S. Pat. No. 8,519,359 to Kingsley et al., U.S. Pat. No. 8,664,624 to Kingsley et al., U.S. Patent Publication No. 2012/0183677 to Agrawal et al., U.S. Pat. No. 9,057,021 to Kingsley et al., and U.S. Pat. No. 8,846,184 to Agrawal et al., all of which are incorporated herein by reference in their entirety.

According to one embodiment, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in some embodiments, the rare earth aluminum garnet type Ce phosphor may serve as the luminescent material 18 with ultra-short-persistence characteristics, which can emit the converted light 26 by absorbing purple to blue excitation light 24 emitted from a light source 72. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material 18 known in the art may be utilized without departing from the teachings provided herein. Additional information regarding the production of short-persistence luminescent materials is disclosed in U.S. Pat. No. 8,163,201 to Kingsley et al. the entire disclosure of which is incorporated herein by reference.

Additionally, or alternatively, the luminescent material 18, according to one embodiment, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light source 72). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to one embodiment, may be operable to emit light at or above an intensity of 0.32 mcd/m$^2$ after a period of 10 minutes. Additionally, the long-persistence luminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long-persistence luminescent material 18 may continually illuminate in response to excitation from any light source 72 that emits the excitation light 24, including, but not limited to, natural light sources (e.g., the sun) and/or any artificial light source 72. The periodic absorption of the excitation light 24 from any excitation source may provide for a substantially sustained charge of the long-persistence luminescent material 18 to provide for consistent passive illumination. In some embodiments, a light sensor may monitor the illumination intensity of the luminescent structure 10 and actuate an excitation source when the illumination intensity falls below 0.32 mcd/m$^2$, or any other predefined intensity level.

The long-persistence luminescent material 18 may correspond to alkaline earth aluminates and silicates, for example doped di-silicates, or any other compound that is capable of emitting light for a period of time once the excitation light 24 is no longer present. The long-persistence luminescent material 18 may be doped with one or more ions, which may correspond to rare earth elements, for example, $Eu^{2+}$, $Tb^{3+}$ and/or $Dy^3$. According to one non-limiting exemplary embodiment, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to one embodiment, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Additional information regarding the production of long-persistence luminescent materials is disclosed in U.S. Pat. No. 8,163,201 to Agrawal et al., the entire disclosure of which is incorporated herein by reference. For additional information regarding long-persistence phosphorescent structures, refer to U.S. Pat. No. 6,953,536 to Yen et al., U.S. Pat. No. 6,117,362 to Yen et al., and U.S. Pat. No. 8,952,341 to Kingsley et al., all of which are incorporated herein by reference in their entirety.

Referring to FIG. 2, a vehicle 28 in the form of a pickup truck is generally shown having a cab 30 and a pickup box 32, according to one embodiment. The pickup box 32 is generally positioned behind the cab 30 and includes a bed 34 surrounded by upstanding sidewalls 36 on two opposing sides. The bed 34 may include a substantially planar portion 38 and two opposing wheel well portions 40. A rear portion 42 of the cab 30 may form a front wall 44 of the box 32. In alternate embodiments, the box 32 may include a front wall 44 in close proximity to the cab 30.

A tailgate 46, which is operable between an open position, as illustrated in FIG. 2, and a closed position, is positioned at a rear end of the pickup box 32. The bed 34, the box sidewalls 36, the front wall 44, and the tailgate 46 define an illuminated storage compartment 48 that is configured to haul and/or stow a variety of cargo items.

A light assembly 50, such as a center high mount stop light (CHMSL) 52, is positioned on an upper portion of the cab 30. The CHMSL 52 is configured to be activated and emit light under a variety of circumstances. For example, the center high mount stop light may emit light during braking of the vehicle 28, as a running light, as a hazard notification. The CHMSL 52 may emit visible light (e.g., red) and/or non-visible light.

A truck bed liner 54 includes a liner bottom section 56, which is adapted to fit on and substantially cover the full width of the bed 34 and two opposing wheel well sections 64, a pair of sidewall sections 58, a front section 60, and a tailgate section 62. As shown in FIG. 2, the liner 54 may contain a plurality of corrugations 128. The liner 54 is used to protect the bed 34 or cargo compartment 48 of the vehicle 28 from detrimental physical impacts, surface abrasion, and/or corrosion due to reactive chemicals. The liner 54 may be used in the beds 34 of pickup trucks, SUV or van cargo compartments, cabinets (such as for the storage compartments 48 of a fire engine or a boat), and/or any other desired location.

The liner 54 may be configured as a "spray-in" and/or "drop-in" liner. Drop-in liners 54 are a preformed component prior to attachment to the vehicle 28, which may be formed from a rigid plastic material that form-fits the bed 34 to be protected. Spray-in liners 54 are formed by spraying a liquid carrier medium, or coating (e.g., polymer), into the truck bed 34 or vehicle cargo compartment 48 and then curing the coating. The sections of the liner 54 may also be provided with an integral anti-slip, frictional material. Such material having a high coefficient of friction will inhibit movement of material placed upon an upper surface of the liner 54 during use of the vehicle 28. The material may be provided by laminating the material to the upper surface of the liner 54 prior to vacuum forming a drop-in liner 54, or coupled to a spray-in liner 54 through any method known in the art. Suitable materials capable of being bonded to the liner 54 and providing such an anti-slip surface include, but are not limited to, a variety of ethylene ethyl acetate (EEA), ethylene vinyl acetate (EVA), thermoplastic rubber (TPR), Saranex, etc.

One or more luminescent structures 10*a*, 10*b*, 10*c* may be integrally disposed within the liner 54, or sections thereof. For example, a first luminescent structure 10*a* may be disposed on the front section 60 of the liner 54, a second luminescent structure 10*b* may be disposed on one or more of the wheel well sections 64, and/or a third luminescent structure 10*c* may be disposed on a top surface of the tailgate section 62 of the liner 54 and/or the tailgate 46. Accordingly, when the tailgate 46 is in an open position, as illustrated in FIG. 2, the open box 32 and the tailgate 46 are visible to vehicles disposed rearwardly of the box 32. The luminescent structures 10*a*, 10*b*, 10*c* may luminesce in any color to notify rearwardly disposed vehicles of the position of the vehicle 28, and open condition of the box 32. Accordingly, in some embodiments, the luminescent structures 10*a*, 10*b*, 10*c* may luminesce in a red color to match a rearwardly facing nighttime running light, which may be disposed in a rear taillight assembly 65 of the vehicle 28. Any section of the liner 54 may include additional luminescent structures 10 therein that may luminesce in any color to provide any desired notification, indicia, and/or decorative effect to the liner 54.

The luminescent structures 10*a*, 10*b*, 10*c* within the liner 54 may luminesce in response to receiving excitation light 24 from any artificial light source 72, such as the CHMSL 52, and/or excitation light 24 emitted from the sun. In some embodiments, the luminescent structures 10*a*, 10*b*, 10*c* may include a long-persistence luminescent material 18, as described above, such that the luminescent structures 10*a*, 10*b*, 10*c* may luminesce for extended durations, such as a period of several minutes or hours, once a night-like lighting condition occurs.

Figure 3:
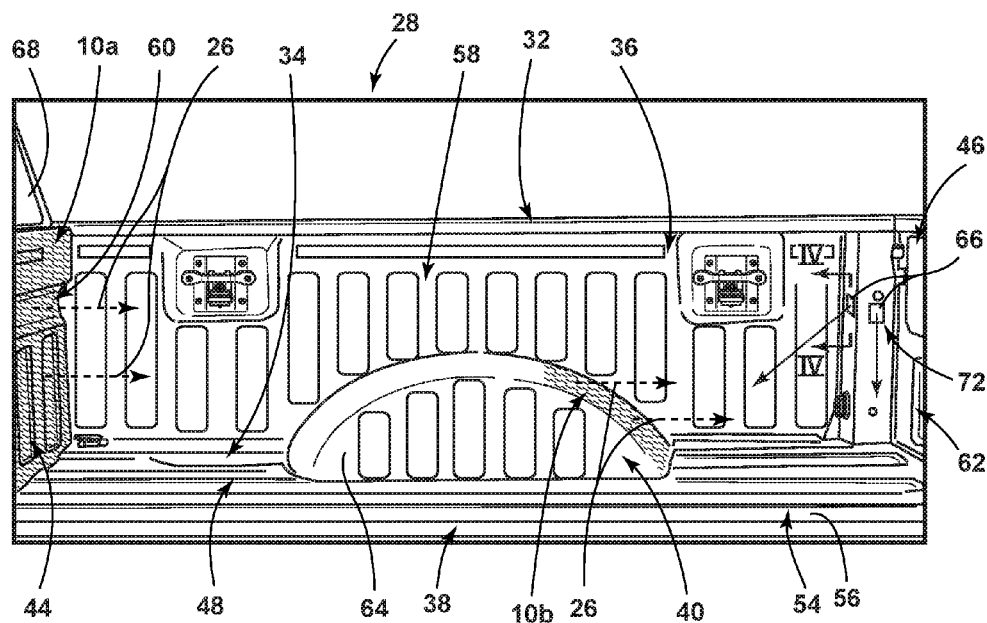
FIG. 3 is a cross-sectional view of the vehicle box taken at line III of FIG. 2.

Referring to FIG. 3, one or more box lights 66 may additionally, and/or alternatively, be disposed within the pickup box 32 and emit excitation light 24 towards at least one luminescent structure 10*a*, 10*b*, 10*c*. For example, the box lights 66 in FIG. 3 are illustrated on a rear portion of the box sidewalls 36. The CHMSL 52 and/or the box lights 66 may emit excitation light 24 toward a rear portion 42 of the vehicle 28, into the pickup box 32, and/or to the sides of the vehicle 28 when activated causing distinct luminescent structures 10*a*, 10*b*, 10*c* within the box 32 to luminesce. In some embodiments, the box lights 66 may illuminate in conjunction with lights disposed within the taillight assembly 65. For example, the box lights 66 may illuminate while a vehicle running light is initiated and/or when a vehicle brake light is illuminated.

In some embodiments, a rear window 68 may include a light filter to prevent excitation light 24 from entering the cab 30. Moreover, the rear window 68 may additionally, or alternatively, include an additional luminescent structure 70 (FIG. 2) thereon that luminesces in response to receiving excitation light 24.

The light assembly 50 and/or the box lights 66 may each include at least one light source 72 therein that is configured to emit non-visible light, such as blue light, ultraviolet (UV) light, infrared light (IR), and/or violet light and may include any form of light source. For example fluorescent lighting, light emitting diodes (LEDs), organic LEDs (OLEDs), polymer LEDs (PLEDs), solid state lighting, or any other form of lighting configured to emit excitation light 24 may be utilized. In response to receiving excitation light 24, the luminescent structures 10*a*, 10*b*, 10*c* may be configured to luminesce in the visible spectrum. According to one embodiment, the light assembly 50 may emit a first wavelength of excitation light 24 that causes the first luminescent structure 10*a* to luminesce. Similarly, the box lights 66 may emit excitation light 24 of a second wavelength that only excites the second luminescent structure 10*b*. In other embodiments, any, and/or all, light sources 72 (natural or artificial) may excite any and/or all luminescent structures 10*a*, 10*b*, 10*c* within and/or on the vehicle 28.

In some embodiments, the first, second, and/or third luminescent structures 10*a*, 10*b*, 10*c* each have substantially different (e.g., non-overlapping and/or offset) absorbance and/or luminesce wavelength spectrums such that different luminescent structures 10*a*, 10*b*, 10*c* may be independently illuminated. That is, the luminescent structures 10*a*, 10*b*, 10*c* may be formulated to have non-overlapping absorption spectrums and Stoke shifts that yield different emission spectrums. Also, in formulating the luminescent structures 10*a*, 10*b*, 10*c*, care should be taken in choosing the associated Stoke shifts such that the converted light 26 emitted from one of the luminescent structures 10*a*, 10*b*, 10*c* does not excite the other, unless so desired. The intensities of the excitation light 24 emitted from the light assembly 50 and/or box lights 66 may also be proportionally varied to one another such that additional colors may be obtained. For energy conversion layers 16 containing more than two distinct luminescent materials 18, a greater diversity of colors may be achieved. Contemplated colors include red, green, blue, and combinations thereof, including white, all of which may be achieved by selecting the appropriate luminescent materials 18 and correctly manipulating the corresponding light sources 72. In some embodiments, the first luminescent structure 10*a* may be a phosphor material while the second luminescent structure 10*b* may be a dye. It will be appreciated that the box 32 may include any number of luminescent structures 10*a*, 10*b*, 10*c* and/or light sources 72 without departing from the scope of the present disclosure.

According to one embodiment, the luminescent structures 10*a*, 10*b*, 10*c* within the liner 54 include a long-persistence luminescent material 18. The luminescent structures 10*a*, 10*b*, 10*c* may luminesce in response to receiving natural and/or artificial excitation light 24. Thus, according to one embodiment, the luminescent structures 10*a*, 10*b*, 10*c* may be activated by UV light. The box lights 66 may also include a light source 72 that emits UV light. Accordingly, the luminescent structures 10*a*, 10*b*, 10*c* may actively (i.e., excited by the light source(s) 72) and/or passively (excited by the sun) luminesce. In some embodiments, non-visible excitation light 24 is emitted from the light sources 72 such that the excitation light 24 is not visible to occupants of proximately disposed vehicles.

Figure 4A:
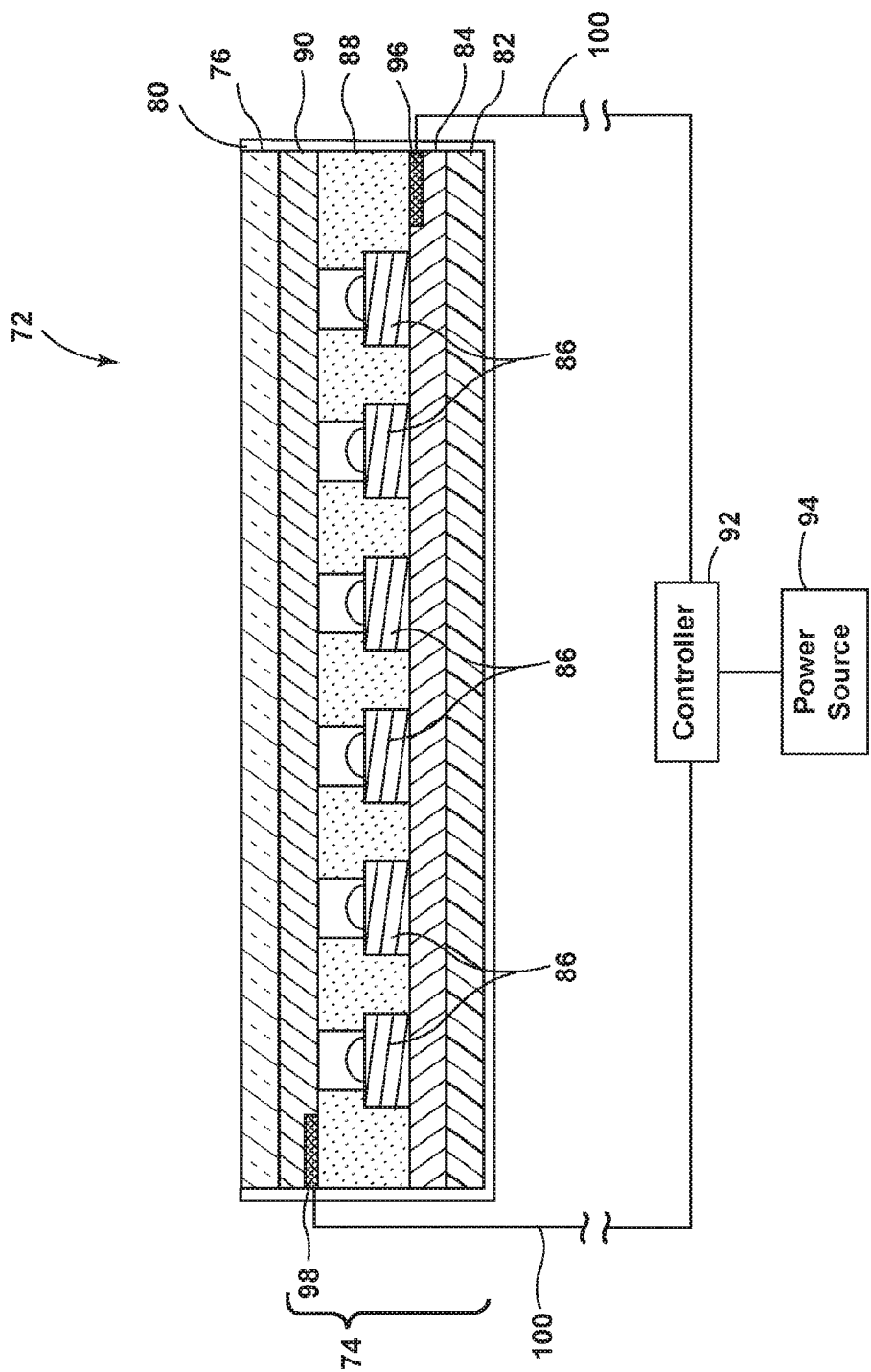
FIG. 4A is a cross-sectional view taken along line IV-IV of FIG. 3 illustrating a light source according to one embodiment.
Figure 4B:
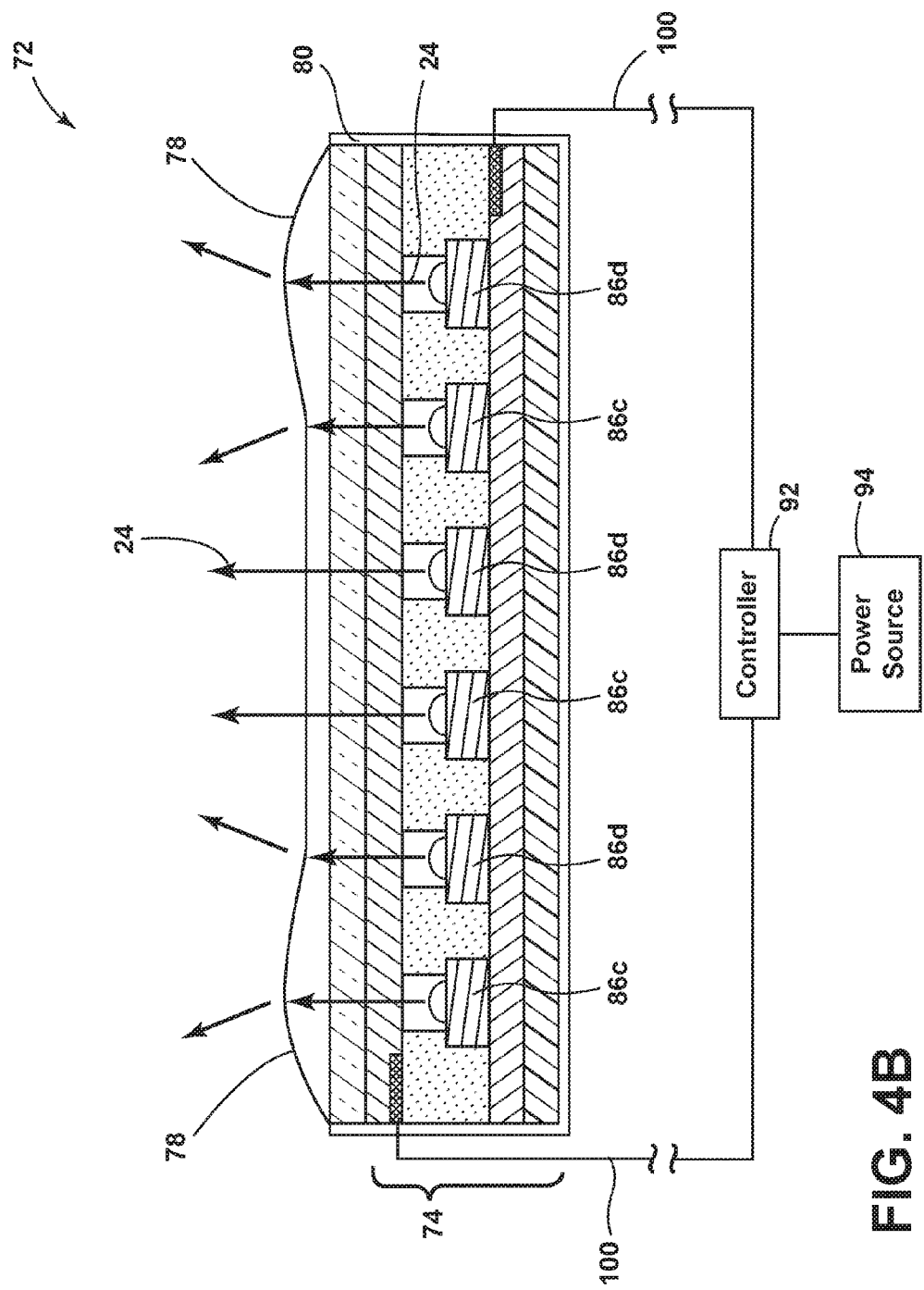
FIG. 4B is a cross-sectional view taken along line IV-IV of FIG. 3 illustrating the light source of FIG. 4A having integrally formed optics, according to one embodiment.

Referring to FIGS. 4A and 4B, a cross-sectional view of the light source 72 capable of use with an external luminescent structure 10 is shown according to one embodiment taken along the line IV-IV of FIG. 3. As illustrated in FIG. 4A, the light source 72 has a stacked arrangement that includes a light-producing assembly 74, a decorative layer 76, and an overmold material 80. It will be appreciated that some embodiments may not include all components shown in FIGS. 4A and 4B.

The light-producing assembly 74 may correspond to a thin-film or printed light emitting diode (LED) assembly and includes a substrate 82 as its lowermost layer. The substrate 82 may include a polycarbonate, poly-methyl methacrylate (PMMA), or polyethylene terephthalate (PET) material on the order of 0.005 to 0.060 inches thick and is arranged over the intended vehicle substrate on which the light source 72 is to be received (e.g., a portion of the box 32 and/or a section of the liner 54, etc.). Alternatively, as a cost saving measure, the substrate 82 may directly correspond to a preexisting structure (e.g., a portion of the box 32 and/or a section of the liner 54, etc.).

The light-producing assembly 74 includes a positive electrode 84 arranged over the substrate 82. The positive electrode 84 includes a conductive epoxy such as, but not limited to, a silver-containing or copper-containing epoxy. The positive electrode 84 is electrically connected to at least a portion of a plurality of LED sources 86 arranged within a semiconductor ink 88 and applied over the positive electrode 84. Likewise, a negative electrode 90 is also electrically connected to at least a portion of the LED sources 86. The negative electrode 90 is arranged over the semiconductor ink 88 and includes a transparent or translucent conductive material such as, but not limited to, indium tin oxide. Additionally, each of the positive and negative electrodes 84, 90 are electrically connected to a controller 92 and the power source 94 via a corresponding bus bar 96, 98 and conductive leads 100. The bus bars 96, 98 may be printed along opposite edges of the positive and negative electrodes 84, 90 and the points of connection between the bus bars 96, 98 and the conductive leads 100 may be at opposite corners of each bus bar 96, 98 to promote uniform current distribution along the bus bars 96, 98. It should be appreciated that in alternate embodiments, the orientation of components within the light-producing assembly 74 may be altered without departing from the concepts of the present disclosure. For example, the negative electrode 90 may be disposed below the semiconductor ink 88 and the positive electrode 84 may be arranged over the aforementioned semiconductor ink 88. Likewise, additional components, such as the bus bars 96, 98 may also be placed in any orientation such that the light-producing assembly 74 may emit converted light 26 towards a desired location.

The LED sources 86 may be dispersed in a random or controlled fashion within the semiconductor ink 88 and may be configured to emit focused or non-focused excitation light 24. The LED sources 86 may correspond to micro-LEDs of gallium nitride elements on the order of about 5 to about 400 microns in size and the semiconductor ink 88 may include various binders and dielectric material including, but not limited to, one or more of gallium, indium, silicon carbide, phosphorous, and/or translucent polymeric binders.

The semiconductor ink 88 can be applied through various printing processes, including ink jet and silk screen processes to selected portion(s) of the positive electrode 84. More specifically, it is envisioned that the LED sources 86 are dispersed within the semiconductor ink 88, and shaped and sized such that a substantial quantity of the LED sources 86 (e.g., over 50%) align with the positive and negative electrodes 84, 90 during deposition of the semiconductor ink 88. The portion of the LED sources 86 that ultimately are electrically connected to the positive and negative electrodes 84, 90 may be illuminated by a combination of the bus bars 96, 98, controller 92, power source 94, and conductive leads 100. Additional information regarding the construction of light-producing assemblies is disclosed in U.S. Pat. No. 9,299,887 to Lowenthal et al., the entire disclosure of which is incorporated herein by reference.

In some embodiments, a decorative layer 76 may be disposed above the light-producing assembly 74. The decorative layer 76 may include a polymeric material or any other suitable material and is configured to control or modify an appearance of the light source 72. For example, the decorative layer 76 may be configured to confer a metallic appearance to the light source 72. The metallic appearance can be disposed within the light source 72 through any method known in the art, including, but not limited to, sputter deposition, vacuum deposition (vacuum evaporation coating), electroplating, or directly printing onto a component of the light source 72. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein.

Referring to FIG. 4B, the light-producing assembly 74 may also include optics 78 that are configured to direct excitation light 24 emitted from the LED sources 86 towards pre-defined locations. For example, excitation light 24 emitted from the LED sources 86 may be directed and/or focused towards the wheel well sections 64 of the liner 54, the front section 60 of the liner 54, the tailgate section 62 of the liner 54, and/or any other location proximate to the box 32.

Figure 5:
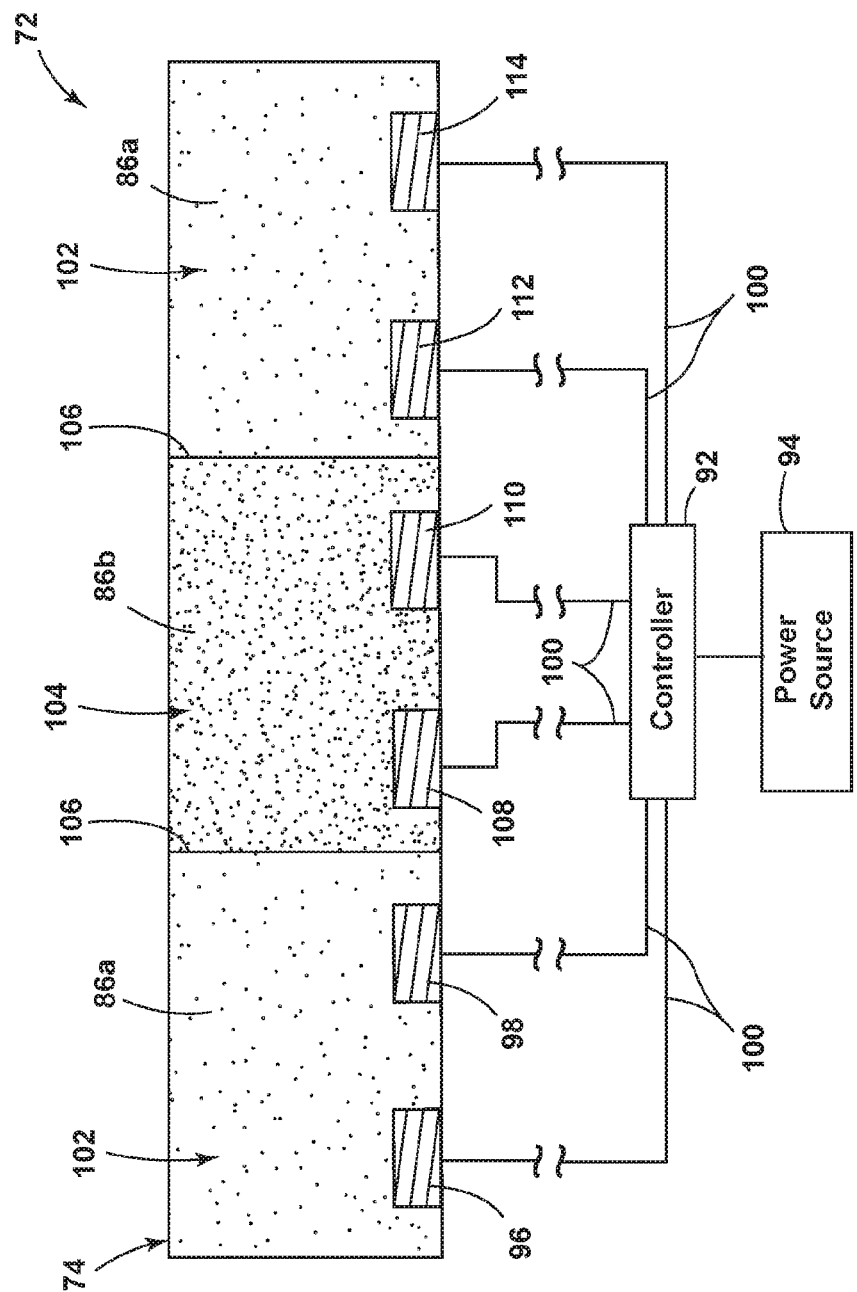
FIG. 5 illustrates a top view of a light-producing assembly, according to one embodiment, having varying types and concentrations of light-emitting diode (LED) sources transversely along the light-producing assembly.

Referring to FIG. 5, a light-producing assembly 74, according to one embodiment, is illustrated from a top view having varying types and concentrations of LED sources 86a, 86b transversely along the light-producing assembly 74. As illustrated, a first portion 102 of the light-producing assembly 74 includes LED sources 86a that are configured to emit an excitation light 24 having a first emission wavelength. Likewise, a second portion 104 of the light-producing assembly 74 includes LED sources 86b that are configured to emit an excitation light 24 having a second emission wavelength. The first and second portions 102, 104 of the light-producing assembly 74 may be separated by insulative, or non-conductive, barriers 106 from proximately disposed portions through any means known in the art such that each portion 102, 104 may be illuminated independently of any other portion 102, 104. The insulative barriers 106 may also prevent a substantial amount of excitation light 24 emitted from proximately illuminated LED sources 86a, 86b from crossing through the insulative barrier 106. Further, each portion 102, 104 disposed within the light-producing assembly 74 may include a respective bus bar 96, 98, 108, 110, 112, 114 coupled to the controller 92 and configured to illuminate each respective portion 102, 104.

The semiconductor ink 88 may also contain various concentrations of LED sources 86a, 86b such that the concentration of the LED sources 86a, 86b, or number of LED sources 86a, 86b per unit area, may be adjusted for various lighting applications. In some embodiments, the concentration of LED sources 86*a*, 86*b* may vary across the length of the light-producing assembly 74. For example, a first portion 102 of the light-producing assembly 74 may have a greater concentration of LED sources 86 than alternate portions 104, or vice versa. In such embodiments, the light source 72 and/or the indicia may appear brighter or have a greater luminance in order to preferentially illuminate pre-defined locations. In other embodiments, the concentration of LED sources 86*a*, 86*b* may increase or decrease with increasing distance from a preselected point.

Figure 6:
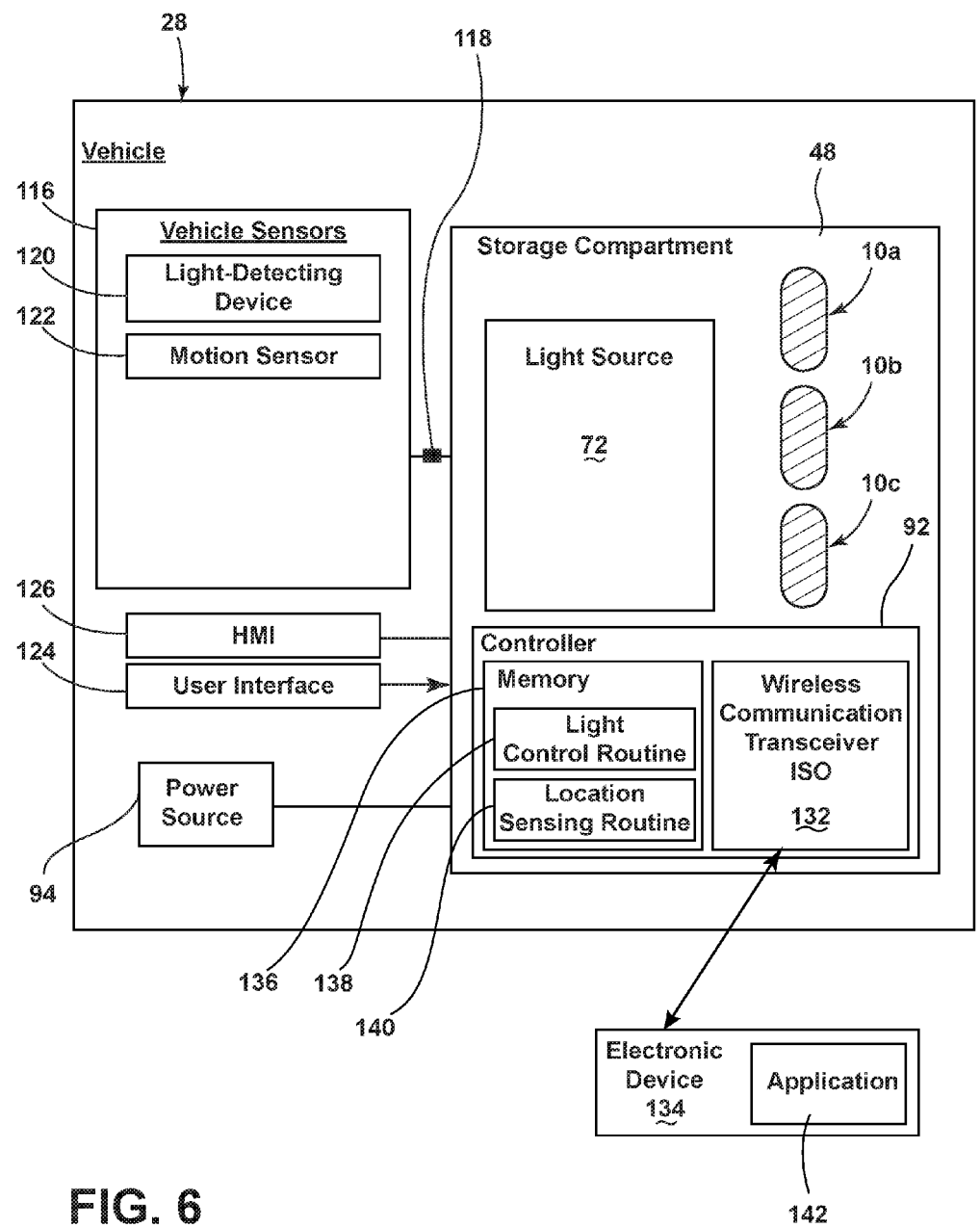
FIG. 6 is a block diagram further illustrating the vehicle employing the illuminated compartment, according to one embodiment.

Referring to FIG. 6, a block diagram of the vehicle 28 is shown in which the illuminated truck box 32 is disposed within the vehicle 28. The power source 94 is connected to the truck box 32 to provide power to the light source 72.

The vehicle 28 may also be equipped with one or more sensors 116 for initiating the light source 72. The one or more vehicle sensors 116 may communicate with the truck box 32 through a multiplex communication bus 118. The multiplex communication bus 118 may be disposed within the truck box 32 and/or the vehicle 28. According to one embodiment, the vehicle 28 may include a light-detecting device 120, a motion sensor 122, and/or any other sensor that may be disposed within the vehicle 28.

The light-detecting device 120 may be utilized for varying the intensity of excitation light 24 emitted from the light source 72. The light-detecting device 120 senses the environmental lighting conditions, such as whether the vehicle 28 is in day-like conditions (i.e., higher light level conditions) and/or whether the vehicle 28 is in night-like conditions (i.e., lower light level conditions). The light-detecting device 120 can be of any suitable type, and can detect the day-like and night-like conditions in any suitable fashion. For instance, in one embodiment, the light-detecting device 120 includes a light sensor that detects the amount of light (e.g., solar radiation) affecting the vehicle 28 for determining whether day-like or night-like conditions exist. According to one embodiment, a lower initial intensity of excitation light 24 may be emitted by the light source 72 when the light-detecting device 120 senses night-like conditions. A higher initial intensity of excitation light 24 may be emitted when the light-detecting device 120 senses day-like conditions.

The motion sensor 122 may be configured as ultrasonic sensors or imaging sensors that may be disposed around the exterior of the vehicle 28 and determine approaching occupants of the vehicle 28. The controller 92 may illuminate the light source 72 if approaching occupants are detected.

In operation, the light source 72 may be activated using a variety of means. For example, the vehicle 28 may include a user interface 124. In some instances, the user interface 124 may be part of a human machine interface (HMI) 126 disposed within the vehicle 28, or the user interface 124 may work in conjunction with the HMI 126. The user interface 124 may be configured such that a user may control the wavelength of excitation light 24 that is emitted by the light source 72 and/or the wavelength of light emitted by the light source 72. Additionally, or alternatively, the user interface 124 may be used to switch the light source 72 through a plurality of modes and/or functions. The user interface 124 may use any type of control known in the art for controlling the light source 72, such as, but not limited to, switches (e.g., proximity sensors, push-type buttons) and may be disposed in any practicable location.

The vehicle 28 may further include one or more of the wireless communication transceivers 132 that may be configured to interact with an electronic device 134. The wireless communication transceivers 132 may communicate with the electronic device 134 over a wireless signal (e.g., radio frequency). The electronic device 134 may include a cellphone, a tablet, a key fob, wearable device (e.g., fitness band, watch, glasses, jewelry, wallet), apparel (e.g., a tee shirt, gloves, shoes or other accessories), personal digital assistant, headphones and/or other devices capable of wireless transmission (e.g., radio frequency, Bluetooth, ultrasonic).

In one non-limiting example, the wireless communication transceivers 132 may be a Bluetooth™ RN4020 module, or an RN4020 Bluetooth™ low energy PICtail board configured to communicate with the electronic device 134 using Bluetooth™ low energy signals. The wireless communication transceivers 132 may include a transmitter and a receiver to transmit and receive wireless signals (e.g., Bluetooth™ signals) to and from the electronic device 134. It will be appreciated that the wireless communication transceivers 132 may utilize other forms of wireless communication between with the electronic device 134 and other wireless communication transceivers 132, such as Wi-Fi™.

The wireless communication transceivers 132 may be positioned on or within the controller 92. The controller 92 may be a dedicated controller or may be a shared controller (e.g., for multiple light assemblies or light assemblies for other body features). The controller 92 may include a processor and a memory 136 for executing stored routines or for storing information (e.g., related to the operation of the light source 72 and/or the electronic device 134). The wireless communication transceiver 132 is configured to communicate with the processor such that one or more of the routines 138, 140 stored in the memory 136 is activated.

The electronic device 134 may include one or more routines 138, 140, which control the communication between the wireless communication transceiver 132 and the electronic device 134. For example, in cellphone embodiments of the electronic device 134, the cellphone may include one or more applications 142 configured to communicate with the wireless communication transceivers 132. In the depicted embodiment, the memory 136 of the controller 92 includes a light control routine 138 and a location sensing routine 140. In various embodiments, the wireless communication transceiver 132 is a standalone device that is not in communication with body control modules, electronic control modules, engine control modules and/or other features of the vehicle 28. For example, the wireless communication transceivers 132 may only be capable of communication with the light source 72 and the electronic device 134. In other embodiments, the wireless communication transceivers 132 may communicate with the body controller and/or other onboard controllers.

The vehicle 28 may include a plurality of wireless communication transceivers 132, similar to that described in connection with the light source 72, positioned around the vehicle 28 (e.g., rear, sides, or front of the vehicle 28). The wireless communication transceivers 132 may be in communication with one another or may mutually communicate with a master controller or module (e.g., body control module). The wireless communication transceivers 132 may be disposed within other accessories of the vehicle 28, or may be stand alone units. The electronic device 134 may communicate with all, some, or none of the wireless communication transceivers 132 as the electronic device 134 enters and exits the communication range of the transceivers 132. Each of the wireless communication transceivers 132 may be aware of its location within the vehicle 28 and capable of sharing its location with the electronic device 134.

In various embodiments, the wireless communication transceivers 132 are capable of communicating with the electronic device 134 such that the location of the electronic device 134 may be determined therefrom (e.g., based on signal strength and/or return time of the signal) or vice versa. According to one embodiment, the location sensing routine 140 in the memory 136 of the controller 92 may utilize the signal strength and time to return of the signals between the plurality of wireless communication transceivers 132 and the electronic device 134 to triangulate the position of the electronic device 134 as the occupant moves around and inside and/or outside of the vehicle 28. In embodiments where the wireless communication transceivers 132 communicate with a master module, the location of the electronic device 134 may be calculated in the master module. The location of the electronic device 134 may have sufficient resolution to determine which door of the vehicle 28 the occupant is approaching. The electronic device 134 may then share its determined location with the wireless communication transceivers 132 such that appropriate features (e.g., illumination of the cargo compartment 48) may be activated by the appropriate transceivers 132. It will be understood that the location sensing routine 140 may be located on the electronic device 134 and that any location determinations may be made by the electronic device 134 and shared with the wireless communication transceivers 132 without departing from the spirit of this disclosure.

The light control routine 138 may process signals from the wireless communication transceiver 132 (e.g., the location of the electronic device 134) to activate the light source 72. Depending on the signals received from the wireless communication transceiver 132 and/or the vehicle sensors 116, the light control routine 138 may be activated. The light control routine 138 may store a predetermined illumination sequence for the light source 72 based on detected properties of the electronic device 134 (e.g., known or unknown device, location, and user specific data). For example, the light control routine 138 may control the light source 72 to follow the electronic device 134 by activating an illumination sequence based on the position of the electronic devices 134. The electronic device 134 may store user specific data and preferences relating to the light source 72 (e.g., color, intensity, pattern, activation distance, etc.) and/or the memory 136 (e.g., the light control routine 138) may store this data.

Choosing which electronic devices 134 should be trusted, and, therefore, given access to command of the controller 92 and/or the wireless communication transceiver 132 (e.g., the light source 72) may be determined based on whether the electronic device 134 has been inside of the vehicle 28 before. The memory of the wireless communication transceivers 132 may store identifying information relating to electronic devices 134 which were detected within the vehicle 28 (e.g., using the location sensing routine 140) and which may therefore be generally regarded as "friendly" and/or as the owner of the vehicle 28.

In an exemplary method of determining that an unknown electronic device 134 is friendly, the wireless communication transceivers 132 detect the presence of an unknown electronic device 134, detect a characteristic signal shift (e.g., attenuation or increase in signal at corresponding wireless communication transceivers 132) indicative of the unknown electronic device 134 entering or being within the vehicle 28 across multiple wireless communication transceivers 132, and store characteristic information about the electronic device 134 for future identification. It will be understood that a determination of the location of the electronic device 134 to be within the vehicle 28 may also prompt a storing of the characteristic information about the electronic device 134 for future identification. Utilizing the past and/or present location of the electronic device 134 as a security feature to determine if it is allowed access to the controller 92 may be particularly advantageous as the replication of signal shifting indicative of the electronic device 134 entering the vehicle 28 and the location of the electronic device 134 is particularly difficult to fake. Further, it will be understood that more conventional methods of connecting electronic devices 134, such as pairing and manually connecting, may also be utilized to designate friendly devices 134.

Integration of vehicle sensors 116 and/or detection of the electronic devices 134 by the wireless communication transceivers 132 may allow for a variety of lighting controls to be affected and illumination sequences to be activated. As described herein, the electronic devices 134 may be used for determining a location of the occupant. Accordingly, the light source 72 may illuminate as an occupant approaches the vehicle 28 and/or uses the cargo compartment 48.

Detection of location of the electronic device 134 relative to the vehicle 28 also permits the wireless communication transceivers 132 to determine if an unrecognized electronic device 134 is proximate the vehicle 28. Such an unrecognized electronic device 134 may be owned or carried by a potential burglar or threat to the vehicle 28.

In events where an unrecognized electronic device 134 is detected proximate the vehicle 28 for greater than a predetermined time, the wireless communication transceivers 132 may activate one or more countermeasures. Countermeasures may include a strobe light from the light source 72 or directing light from the electronic device 134. In some embodiments, any available identifying information about the electronic device 134 may be stored for later retrieval if the owner of the vehicle's electronic device 134 is not detected proximate the vehicle 28 at the same time. The wireless communication transceivers 132 may store greater than fifty electronic devices 134 that may have been a threat.

In operation, each luminescent structure 10a, 10b, 10c may exhibit a constant unicolor or multicolor illumination. For example, the controller 92 may prompt the light source 72 to emit only a first wavelength of excitation light 24 to cause the first luminescent structure 10a to luminesce in the first color (e.g., red). Alternatively, the controller 92 may prompt the light source 72 to emit only a second wavelength of excitation light 24 to cause the second luminescent structure 10 to luminesce in the second color (e.g., blue). Alternatively still, the controller 92 may prompt the light source 72 to emit only a third wavelength of excitation light 24 to cause the third luminescent structure 10c to luminesce in the third color (e.g., green). Alternatively still, the controller 92 may prompt the light source 72 to simultaneously emit the first, second, and/or third wavelengths of excitation light 24 in any combination to cause the luminescent structures 10a, 10b, 10c to luminesce in a fourth color defined by an additive light mixture of the first, second, and/or third colors. Moreover, additional luminescent structures 10 may be added to the truck box 32 that convert the excitation light 24 emitted from the light source 72 to a different wavelength. The controller 92 may prompt the light source 72 to periodically emit the first and/or second wavelengths of excitation light 24 at a regular time interval and/or an irregular time interval.

With respect to the above examples, the controller 92 may modify the intensity of the emitted first, second, and third wavelengths of excitation light 24 by pulse-width modulation or current control. In some embodiments, the controller 92 may be configured to adjust a color of the converted light 26 by sending control signals to adjust an intensity or energy output level of the light source 72. For example, if the light source 72 is configured to output the excitation light 24 at a low level, substantially all of the excitation light 24 may be converted to the outputted, visible converted light 26. If the light source 72 is configured to emit excitation light 24 at a high level, only a portion of the excitation light 24 may be converted to the converted light 26 by the luminescent structures 10a, 10b, 10c. In this configuration, a color of light corresponding to mixture of the excitation light 24 and the converted light 26 may be output as the outputted light. In this way, each of the controllers 92 may control an output color of the outputted light.

Though a low level and a high level of intensity are discussed in reference to the excitation light 24, it shall be understood that the intensity of the excitation light 24 may be varied among a variety of intensity levels to adjust a hue of the color corresponding to the emitted excitation and/or converted light 24, 26 from the light source 72. As described herein, the color of the converted light 26 may be significantly dependent on the particular luminescent material 18 utilized in the luminescent structure 10a, 10b, 10c. Additionally, a conversion capacity of the luminescent structure 10a, 10b, 10c may be significantly dependent on a concentration of the luminescent material 18 utilized in the luminescent structure 10a, 10b, 10c. By adjusting the range of intensities that may be emitted from the light source 72, the concentration and proportions of the luminescent materials 18 in the luminescent structure 10a, 10b, 10c and the types of luminescent materials 18 utilized in the luminescent structure 10a, 10b, 10c discussed herein may be operable to generate a range of color hues of outputted light by blending the excitation light 24 with the converted light 26. It is also contemplated that the intensity of each light source 72 may be varied simultaneously, or independently, from any number of other light sources 72.

A variety of advantages may be derived from the use of the present disclosure. For example, use of the disclosed truck box may allow for consistent lighting of the truck bed of the vehicle for notification and aesthetic purposes. Further, use of the wireless communication transceivers allows for the light source to be activated as a person approaches. Further, due to the low package space requirements of the light source, the light source may be adhesively bonded within any interior portion of the truck box. Finally, use of the wireless communication transceivers allows for a low consumption of power from the vehicle while the vehicle is not in use.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:
1. A vehicle comprising:
a pickup box defining a storage compartment therein;
a liner disposed on an exterior surface of the pickup box; and a first luminescent structure disposed within the liner and configured to luminesce in response to receiving excitation light from a first light source separately disposed from the liner.

2. The vehicle of claim 1, wherein the luminescent structure includes a long-persistence luminescent material therein.

3. The vehicle of claim 1, wherein the light source is configured as a center high mount stop light.

4. The vehicle of claim 1, wherein the light source is disposed within a box light that is disposed within the pickup box.

5. The vehicle of claim 1, wherein the liner is a drop-in liner that is preformed prior to attachment to the vehicle and the luminescent structure is disposed within a rigid material that forms the liner.

6. The vehicle of claim 1, wherein the luminescent structure is disposed within a spray-in liner that is formed from a liquid carrier medium.

7. The vehicle of claim 1, wherein the first light source excites a first luminescent structure and a second light source excites a second luminescent structure disposed within the liner.

8. A vehicle comprising:
   a storage compartment of a pickup box;
   a first light source configured to emit light on a liner within the storage compartment; and
   first and second luminescent structures disposed within the storage compartment, wherein the first and second luminescent structures independently luminesce based on a wavelength of an excitation light received from the light source.

9. The vehicle of claim 8, wherein the first and second luminescent structures each comprise at least one luminescent material configured to down convert an excitation light received from at least a portion of the light sources into a visible light.

10. The vehicle of claim 8, wherein the excitation light comprises one of blue light, violet light, and UV light.

11. The vehicle of claim 8, wherein at least one of the first and second luminescent structures are configured to have a perceptible glow for greater than 10 hours after charging.

12. The vehicle of claim 8, wherein at least one of the first and second luminescent structures a is disposed on a front section of the liner.

13. The vehicle of claim 8, wherein at least one of the first and second luminescent structures is disposed above a wheel well of the vehicle.

14. The vehicle of claim 8, wherein the luminescent structure is disposed on the liner, wherein the liner is disposed within the compartment.

15. A vehicle comprising:
   a pickup box defining a storage compartment therein;
   a light source configured to direct excitation light into the storage compartment;
   a liner disposed within the storage compartment; and
   a luminescent structure separately disposed from the light source on an upwardly extending surface of the storage compartment, wherein the luminescent structure luminesces in response to receiving excitation light from the light source.

16. The vehicle of claim 15, wherein the luminescent structure includes a long-persistence luminescent material therein.

17. The vehicle of claim 15, wherein the luminescent structure includes at least one luminescent material configured to convert an excitation light received from at least a portion of the light source into a visible light.

18. The vehicle of claim 15, wherein the light source is disposed within a light assembly that is coupled to a cab of the vehicle.

19. The vehicle of claim 15, wherein the light source is disposed within a box light.

20. The vehicle of claim 15, wherein the luminescent structure is configured as a running light that notifies rearwardly disposed vehicles of an open compartment of the vehicle.

* * * * *